Patented July 14, 1942

2,289,478

UNITED STATES PATENT OFFICE 2,289,478

PROCESS OF MAKING PHENOLIC RESINS DIRECT FROM TAR ACID OILS

Walter T. Brown, Pittsburgh, Pa., assignor to Jones & Laughlin Steel Corporation, Pittsburgh, Pa., a corporation of Pennsylvania No Drawing. Application April 8, 1941, Serial No. 387,447

14 Claims. (Cl. 260—57)

This invention relates to a process of making phenolic resins direct from tar acid oil to produce resins suitable for coatings, for making varnishes or for making plastics and molded products. Briefly stated, the invention comprises reacting an aldehyde with tar acid oil fraction containing a substantial amount of phenol and cresols, the tar acid oil containing hydrogen sulphide or other sulphides naturally present in the oil and acting as a catalyst for the reaction. After the resin producing reaction has been initiated, a catalyst, such for example as dilute solution of sodium hydroxide, is added and the reaction is continued. The sodium hydroxide not only acts as a catalyst but absorbs excess sulphides present in the mixture. The water and neutral oil are removed from the phenolic resin by means of atmospheric or vacuum distillation, evaporation or decantation.

The tar acid oil which is reacted with the aldehyde is coke oven tar acid oil fraction distilling between about 175 and 206° C. and contains hydrogen sulphide and other sulphides naturally present in the tar acid oil. This fraction distilling between about 175 and 206° C. contains about 50 to 65% phenol and cresols. The boiling point of phenol and cresols is as follows:

| | Degree Centigrade |
|---|---|
| Phenol | 181 |
| O-cresol | 191 |
| P-cresol | 203 |
| M-cresol | 204 |

The aldehyde used for reacting with the tar acid oil fraction is preferably a 40% aqueous solution of formaldehyde, since it is the best and least expensive of the aldehydes. However, the invention is not restricted to formaldehyde but I may use para-formaldehyde or any other suitable aldehyde.

In carrying out the reaction between the tar acid oil fraction and the aldehyde, I prefer to use the hydrogen sulphide and other sulphides naturally present in the tar acid oil as the catalyst during the early part of the reaction. In other words, during the first part of the reaction I do not add catalysts to the mixture of aldehyde and tar acid oil fraction. After the reaction has proceeded, I then add an alkaline catalyst, preferably a dilute solution of sodium hydroxide, and continue the reaction. I have found that when a catalyst is added to the tar acid oil and aldehyde at the start of the reaction, a rubbery resin is produced which is not satisfactory for plastics or coatings because it is insoluble and infusible. On the other hand, where according to my invention an alkaline catalyst is added to the reaction mixture only after the reaction has been started, the phenolic resin so produced is both soluble in oils and other solvents, is fusible and produces suitable coatings and plastics.

The present invention may be carried out as follows, it being understood that this is merely given by way of illustrating the invention and that the invention is not limited to the preferred procedure.

250 grams of coke oven tar acid oil fraction distilling between 175 and 206° C. is mixed with 250 grams of 40% formaldehyde solution. The tar acid oil contains about 50 to 65% of phenol and cresols, the remainder being principally neutral oil. The mixture of tar acid oil and formaldehyde is heated in an oil bath in a glass flask equipped with a thermometer, a mechanical stirring device and a reflux condenser. The mixture is heated for about 30 minutes at a temperature under 100° C. The temperature may be between 90 and 100° C. and preferably is between 94 and 98° C. During the heating, the mixture is stirred continuously and loss of phenol or oils is prevented by running water through the reflux condenser. 5 cc. of 10% solution of sodium hydroxide are added slowly and the temperature maintained under 100° C., preferably at about 96° C. for one hour with continuous stirring. The phenolic resin settles to the bottom immediately after stirring is stopped and the flask is taken out of the oil bath, with the aqueous layer and neutral oil on the top.

The neutral oil and aqueous layer may be removed by decantation, evaporation or vacuum distillation. The simplest method is decantation and the neutral oil separated from the aqueous solution.

The phenolic resin is then heated for about one hour at a temperature of about 105° C. with continuous stirring in order to remove traces of water, neutral oil and excess formaldehyde. If vacuum distillation is used for this purpose, it is not necessary to heat the phenolic resin to remove the last traces of water, neutral oil and excess formaldehyde. The phenolic resin is now ready for use as a coating composition or as an adhesive in the production of laminated products. It is fusible and soluble, so that it may be dissolved in solvents for use as varnish or coatings or it may be used for making plastics.

If it is desired to use this phenolic resin for plastics or molded products, it is heated further with or without a small quantity of hexamethylenetetramine or other aldehyde and then ground to a powder. This heating is preferably at a temperature of about 105 to 115° C., so as to produce an insoluble but fusible product. The phenolic resin may be heated and sprayed into a heat dryer such as used for making soap powder or dry milk, so as to produce a powdered phenolic resin. The powdered phenolic resin, whether produced by spraying or grinding, may be blended with wood flour, asbestos or other suitable fillers and then molded in any desired form by means of heat and pressure producing an insoluble and infusible plastic molded product.

The neutral oil produced according to my process contains only 2 to 3% of tar acids (phenol and cresols) showing that more than 95% of the phenol-cresols have been converted to phenolic resins. The neutral oil may be sold as a cattle fly spray or may be refined to recover high flash naphtha, high boiling pyridines, tetrahydronaphthalene (tetralin) and naphthalene. The neutral oil has a boiling range of 170° C. to 210° C.

In the specific example already given, the tar acid oil was that fraction distilling between 175 and 206° C. In certain cases, I prefer to collect fractions of tar acid oil distillate, such fractions distilling between 175–185° C., 185–195° C. and 195–206° C. and to blend these fractions in order to obtain the particular phenolic resin desired. Thus phenol which has a boiling point of 181° C. is found principally in the 175–185° C. fraction. Ortho-cresol boiling at 191° C. is found principally in the 185–195° C. fraction and para- and meta-cresol boiling respectively at 203 and 204° C. are found principally in the 195–206° C. fraction. By separating the tar acid oil into narrow fractions and blending these fractions, resins of various desired characteristics may be obtained. The tar acid oil fractions containing phenol, para-cresol and meta-cresol make the best resins for use in the manufacture of plastics. By blending with such fractions different amounts of the fraction containing ortho-cresol, the flexibility of the resin may be controlled as desired.

In the above example in which the coal tar acid oil fraction was that distilling between 175 and 206° C., the fraction contained about 50–65% total of phenol and cresols. In some cases, however, I may wish to produce fractions having a higher content of phenol or any particular one or mixtures of the cresols or mixtures of phenol and cresol or cresols. In such case, I may fractionate within even narrower ranges and then use any one of these narrow fractions or I may blend mixtures thereof to produce distillates which are then reacted with an aldehyde according to the present invention. I may collect fractions of coal tar acid oil distilling between 180–183° C., 190–193° C. and 202–205° C. The fraction distilling between 180–183 C. consists principally of phenol and may contain up to about 95% phenol in the presence of neutral oil and perhaps a trace of ortho-cresol. Similarly the fraction distilling between 190–193° C. may contain up to 95% ortho-cresol in the presence of neutral oil and traces of phenol and meta- and para-cresol. The fraction distilling between 202–205° C. may contain up to about 95% para and meta-cresol in the presence of neutral oil and traces of ortho-cresol. Phenolic resins may be made from any of these fractions or one or more of the fractions may be blended and the blended mixture utilized for the production of the resins. In this way, resins of any desired characteristics may be produced by varying the proportions of the different fractions used in making the blended mixture.

The tar acid oil fraction used according to the present invention is obtained from coke oven tar—i. e. tar produced by the carbonization of coal in a by-product coke oven. The fraction of tar acid oil which I employ distills between about 175 and 206° C. I have found that this fraction produces very superior resins.

An important feature of the present invention is that the hydrogen sulphide or other sulphides naturally present in the tar acid oil act as a catalyst during the early stage of the reaction between the tar acid oils and the aldehyde and it is not until after the reaction has continued for an appreciable length of time that other catalysts are employed. Thus in the specific example the sodium hydroxide catalyst was not added until after the initial reaction mixture had been heated for about 30 minutes. This procedure results in resins which are soluble and fusible instead of producing rubbery resins which are unsatisfactory for plastics or coatings.

The invention is not limited to the specific example, which has been given merely for illustrative purposes, but may be otherwise embodied or practiced within the scope of the following claims.

I claim:

1. The process of making phenolic resins, which comprises mixing an aqueous solution of aldehyde of the group consisting of formaldehyde and para-formaldehyde and coke oven tar acid oil fraction distilling between about 175 and 206° C. and containing sulphides present in the oil, heating the mixture to reaction temperature and reacting it for a substantial period of time without added catalyst, and thereafter adding an alkaline catalyst and continuing the reaction.

2. The process of making phenolic resins, which comprises mixing an aqueous solution of aldehyde of the group consisting of formaldehyde and para-formaldehyde and coke oven tar acid oil fraction distilling between about 175 and 206° C. and containing sulphides present in the oil, heating the mixture to reaction temperature and reacting it for a substantial period of time without added catalyst, and thereafter adding sodium hydroxide and continuing the reaction.

3. The process of making phenolic resins, which comprises mixing an aqueous solution of aldehyde of the group consisting of formaldehyde and para-formaldehyde and coke oven tar acid oil fraction distilling between about 175 and 206° C. and containing sulphides present in the oil, heating the mixture at a temperature of about 90 to 100° C. and reacting it for a substantial period of time without added catalyst, and thereafter adding an alkaline catalyst and continuing the reaction.

4. The process of making phenolic resins, which comprises mixing an aqueous solution of aldehyde of the group consisting of formaldehyde and para-formaldehyde and coke oven tar acid oil fraction distilling between about 175 and 206° C. and containing sulphides present in the oil, heating the mixture at a temperature of about 94 to 98° C. and reacting it for a substantial period of time without added catalyst, and thereafter adding an alkaline catalyst and continuing the reaction.

5. The process of making phenolic resins, which comprises mixing an aqueous solution of aldehyde of the group consisting of formaldehyde and para-formaldehyde and coke oven tar acid oil fraction distilling between about 175 and 206° C. and containing sulphides present in the oil, said tar acid oil fraction containing about 50 to 65% phenol and cresols, heating the mixture at a temperature of about 94 to 98° C. and reacting it for a substantial period of time without added catalyst, and thereafter adding an alkaline catalyst and continuing the reaction.

6. The process of making phenolic resins, which comprises collecting a fraction of coke oven tar acid oil distilling between 175° C. and 185° C. and containing sulphides present in the oil, mixing said fraction with an aqueous solution of aldehyde of the group consisting of formaldehyde and para-formaldehyde and heating the mixture to reaction temperature and reacting it for a substantial period of time without added catalyst, and thereafter adding an alkaline catalyst and continuing the reaction.

7. The process of making phenolic resins, which comprises collecting a fraction of coke oven tar acid oil distilling between 185° C. and 195° C. and containing sulphides present in the oil, mixing said fraction with an aqueous solution of aldehyde of the group consisting of formaldehyde and para-formaldehyde and heating the mixture to reaction temperature and reacting it for a substantial period of time without added catalyst, and thereafter adding an alkaline catalyst and continuing the reaction.

8. The process of making phenolic resins, which comprises collecting a fraction of coke oven tar acid oil distilling between 195° C. and 206° C. and containing sulphides present in the oil, mixing said fraction with an aqueous solution of aldehyde of the group consisting of formaldehyde and para-formaldehyde and heating the mixture to reaction temperature and reacting it for a substantial period of time without added catalyst, and thereafter adding an alkaline catalyst and continuing the reaction.

9. The process of making phenolic resins, which comprises collecting fractions of coke oven tar acid oil distilling between 175° C.–185° C., 185° C.–195° C., and 195° C.–206° C., blending the fractions to produce a distillate of desired characteristics and containing sulphides present in the tar acid oil, mixing the blended distillate with an aqueous solution of aldehyde of the group consisting of formaldehyde and para-formaldehyde and heating the mixture to a temperature of about 90 to 100° C., and reacting it for a substantial period of time without added catalyst, and thereafter adding an alkaline catalyst and continuing the reaction.

10. The process of making phenolic resins, which comprises collecting a fraction of coke oven tar acid oil distilling between 180° C. and 183° C. and containing sulphides present in the oil, mixing said fraction with an aqueous solution of aldehyde of the group consisting of formaldehyde and para-formaldehyde and heating the mixture to reaction temperature and reacting it for a substantial period of time without added catalyst, and thereafter adding an alkaline catalyst and continuing the reaction.

11. The process of making phenolic resins, which comprises collecting a fraction of coke oven tar acid oil distilling between 190° C. and 195° C. and containing sulphides present in the oil, mixing said fraction with an aqueous solution of aldehyde of the group consisting of formaldehyde and para-formaldehyde and heating the mixture to reaction temperature and reacting it for a substantial period of time without added catalyst, and thereafter adding an alkaline catalyst and continuing the reaction.

12. The process of making phenolic resins, which comprises collecting a fraction of coke oven tar acid oil distilling between 202° C. and 205° C. and containing sulphides present in the oil, mixing said fraction with an aqueous solution of aldehyde of the group consisting of formaldehyde and para-formaldehyde and heating the mixture to reaction temperature and reacting it for a substantial period of time without added catalyst, and thereafter adding an alkaline catalyst and continuing the reaction.

13. The process of making phenolic resins, which comprises collecting fractions of coke oven tar acid oil distilling between 180°–183° C., 190–193° C., and 202–205° C., blending the fractions to produce a distillate containing up to about 95% phenol and cresols and containing sulphides present in the oil, mixing the blended distillate with an aqueous solution of aldehyde of the group consisting of formaldehyde and para-formaldehyde and heating the mixture to reaction temperature and reacting it for a substantial period of time without added catalyst, and thereafter adding an alkaline catalyst and continuing the reaction.

14. The process of making phenolic resins, which comprises mixing coke oven tar acid oil fraction distilling between 175 and 206° C. and containing sulphides present in the oil with aqueous formaldehyde solution, heating the mixture at a temperature of about 90 to 100° C. without added catalyst for a substantial period of time, and thereafter adding an alkaline catalyst and continuing the reaction.

WALTER T. BROWN.